Sept. 12, 1961  G. E. WIMMER  2,999,454
LIQUID DUPLICATOR
Filed Dec. 22, 1955  4 Sheets—Sheet 1
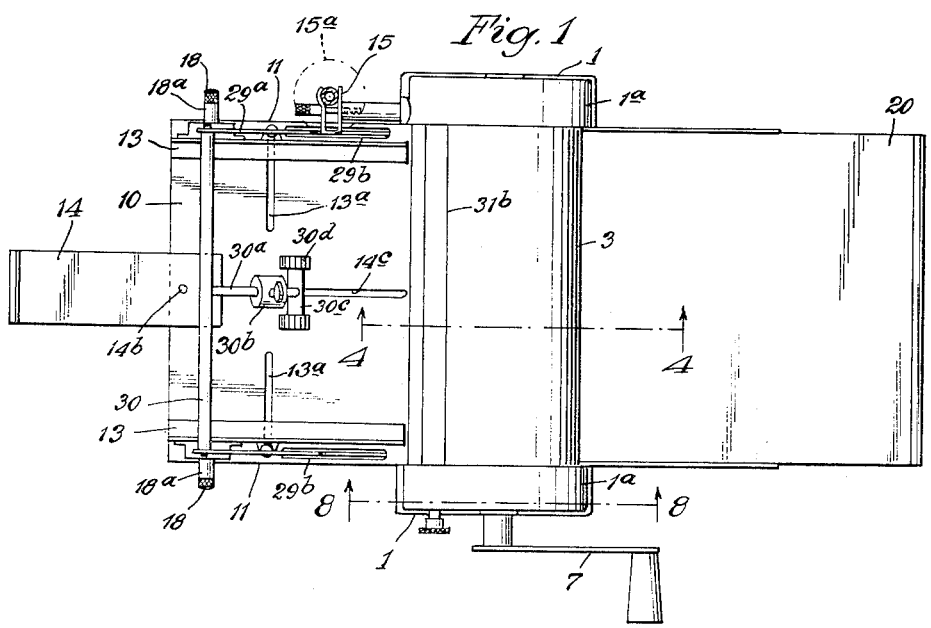
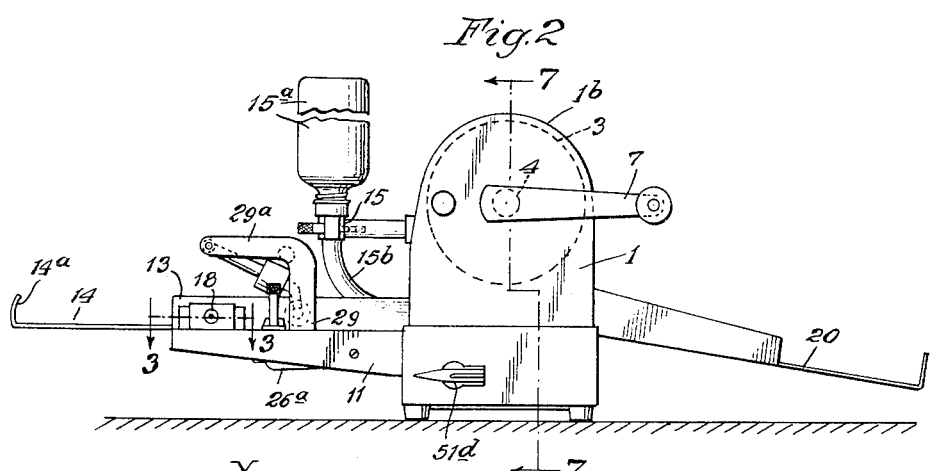
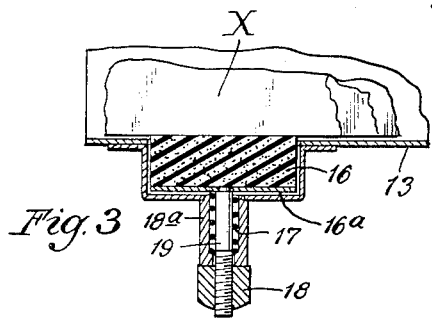
Inventor
Glen E. Wimmer
by Parker & Carter
Attorneys

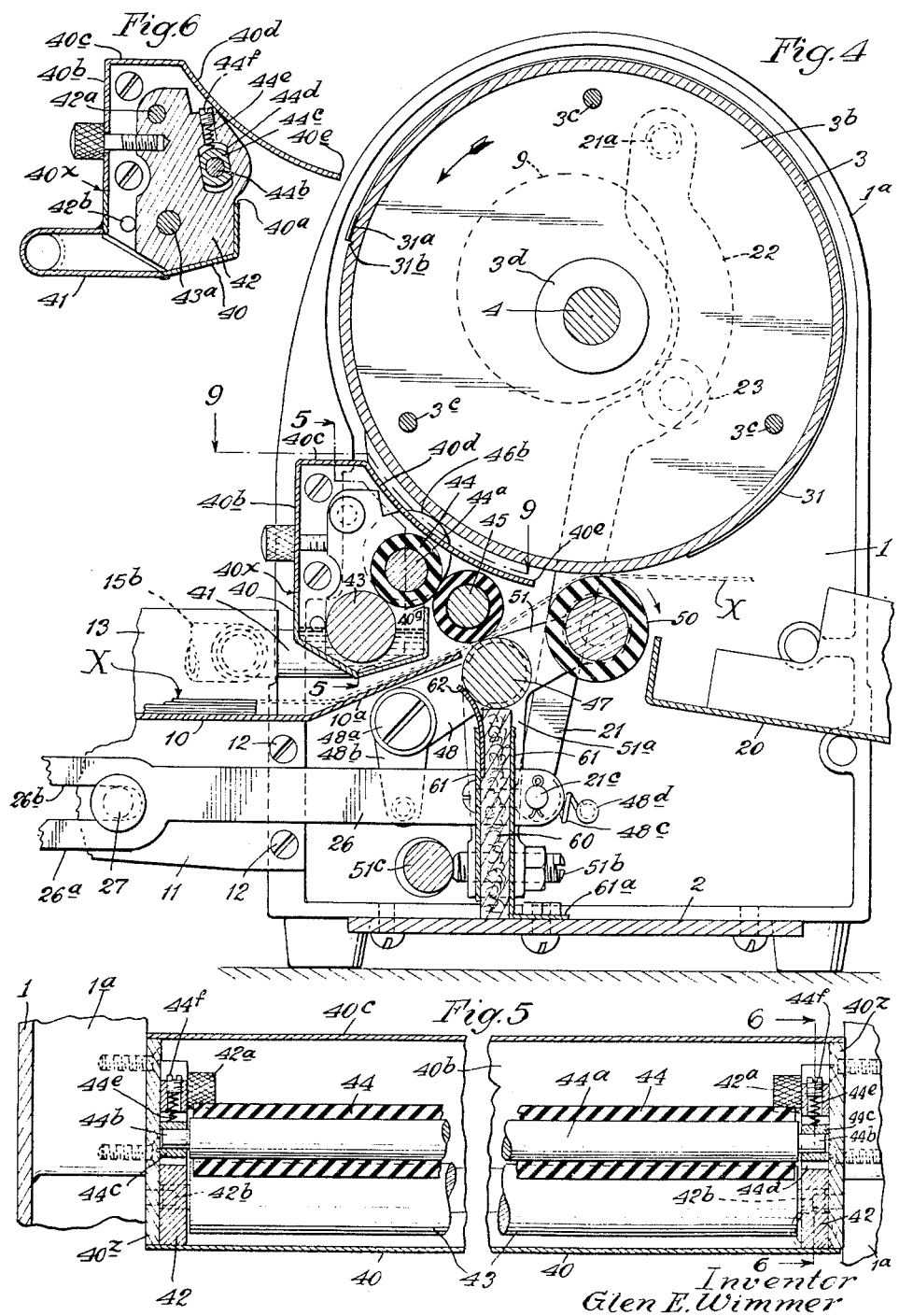

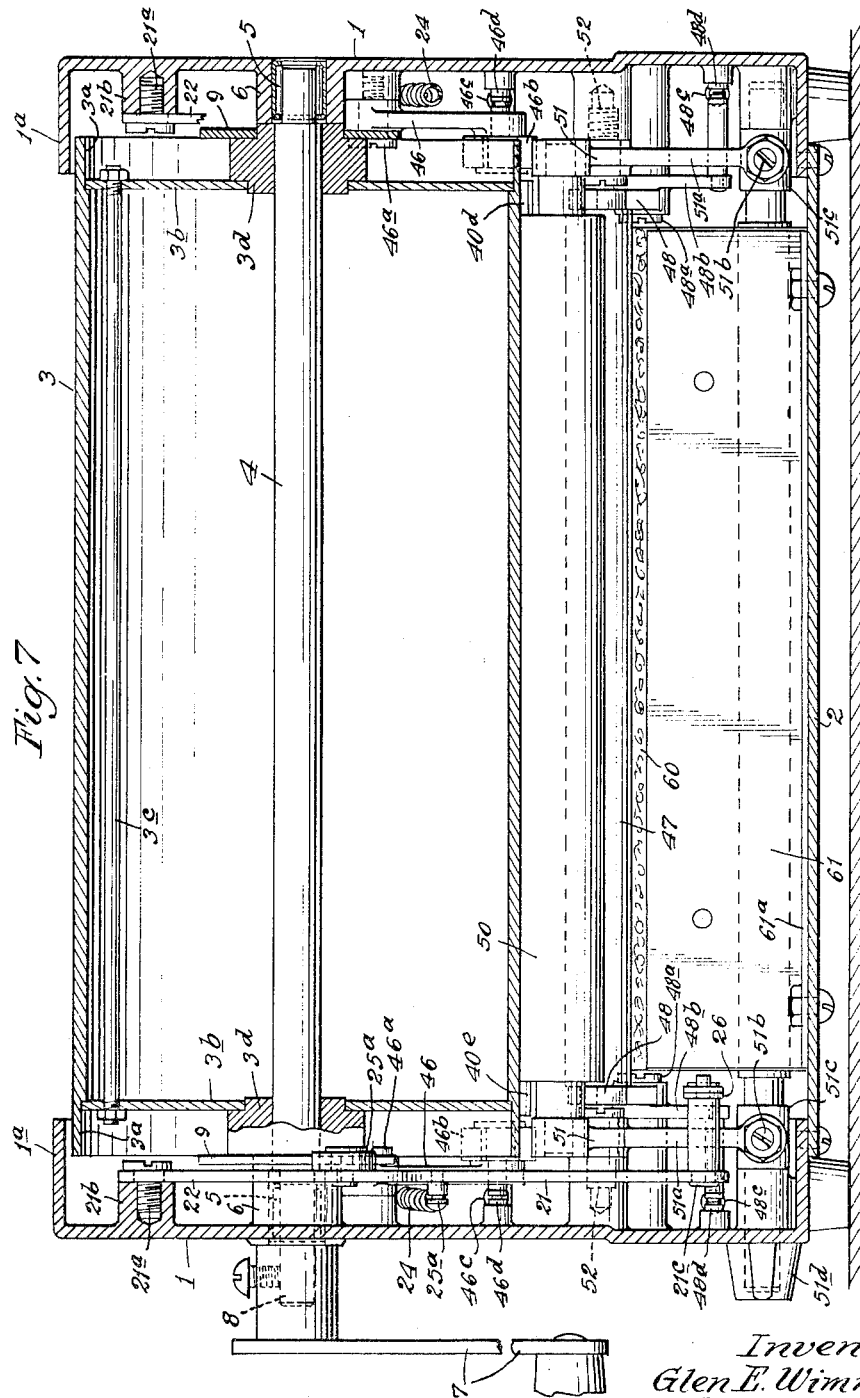

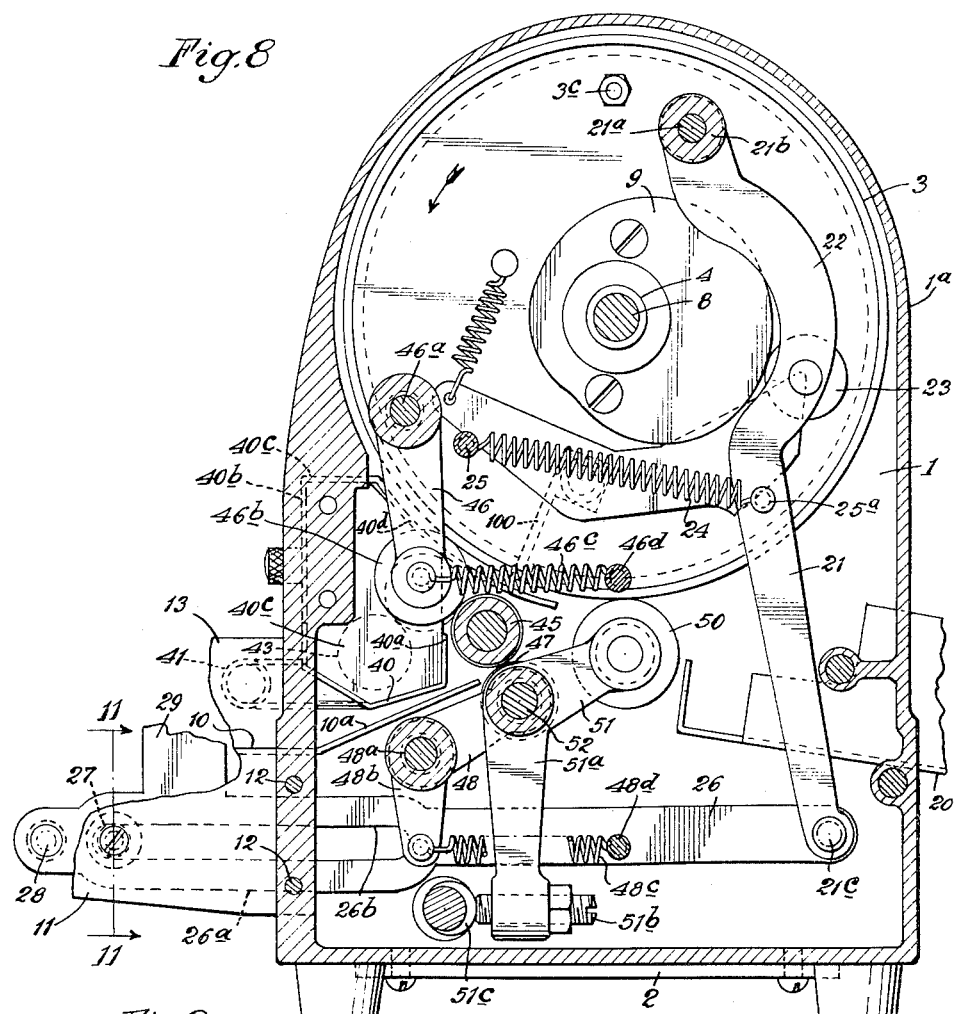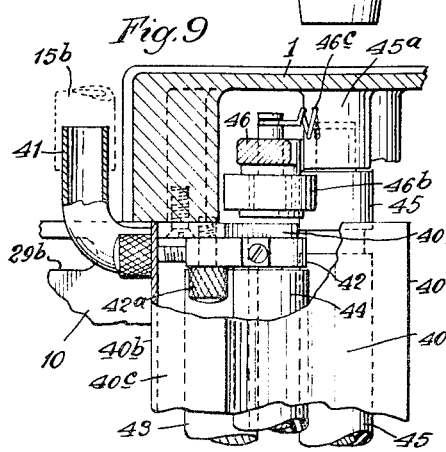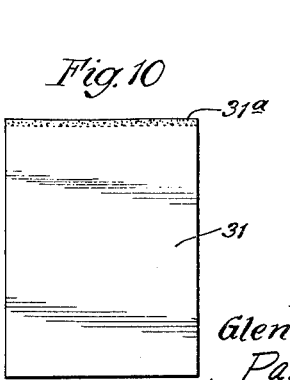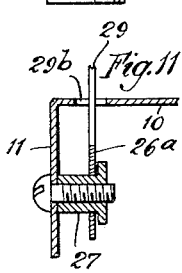
Inventor
Glen E. Wimmer
by Parker & Carter
Attorneys

United States Patent Office 2,999,454
Patented Sept. 12, 1961

2,999,454
LIQUID DUPLICATOR
Glen E. Wimmer, Chicago, Ill.
(231 Custer Ave., Evanston, Ill.)
Filed Dec. 22, 1955, Ser. No. 554,679
11 Claims. (Cl. 101—132.5)

My invention relates to an improvement in liquid duplicators, and has for one purpose to provide a liquid duplicator which shall be relatively small, simple and compact.

Another purpose is improved means for applying the liquid used.

Another purpose is improved means for feeding sheets to the duplicator.

Another purpose is an improved drum and feeder assembly.

Another purpose is an improved drum.

Another purpose is improved means for registering the sheets.

Another purpose is improved means for feeding the sheets.

Other purposes will appear from time to time in the course of the specification and claims.

I illustrate the invention more or less diagrammatically in the accompanying drawings, wherein:

FIGURE 1 is a plan view;

FIGURE 2 is a side view;

FIGURE 3 is a section on an enlarged scale on the line 3—3 of FIGURE 2;

FIGURE 4 is a section on an enlarged scale on the line 4—4 of FIGURE 1;

FIGURE 5 is a section on the line 5—5 of FIGURE 4;

FIGURE 6 is a section on the line 6—6 of FIGURE 5;

FIGURE 7 is a section on an enlarged scale on the line 7—7 of FIGURE 2;

FIGURE 8 is a section on an enlarged scale on the line 8—8 of FIGURE 1;

FIGURE 9 is a section on the line 9—9 of FIGURE 4;

FIGURE 10 is a plan view on a reduced scale of one of the sheets; and

FIGURE 11 is a section on the line 11—11 of FIGURE 8.

Like parts are indicated by like symbols throughout the specification and drawings.

Referring to the drawings, 1, 1, illustrate end members which may be suitably secured by means which may include a bottom plate 2. Each of the members 1 is concave, the concavities being opposed to each other and each such member 1 has a side wall 1a extending about its edge. It will be observed, as in FIGS. 2 and 8, that the upper edges of the members 1 are generally arcuate, as at 1b, that part of the walls 1a being formed to surround the opposite ends of the cylinder or drum generally indicated as 3.

It will be observed that in the example herein shown, the drum 3 is shown as defining an unbroken cylindrical surface. It should be noted that the drum wall has a uniform thickness around its periphery at any transverse section of the drum. Furthermore the drum wall is continuous and not broken, as is the case with many conventional machines. As shown, for example, in FIGURE 7, the drum 3 has end portions 3a which are internally of slightly greater diameter than the rest of the drum wall. These serve as limits for holding drum end plates 3b which are drawn toward each other by any suitable means, for example, as by tie rods 3c. The plates 3b are apertured to receive bearing or hub elements 3d which may be suitably secured to a shaft 4 supported in bearings 5 at its ends in any suitable sleeves or bosses formed in the end frame members 1, as at 6. 7 is any suitable handle shown as secured to the outwardly extending ends 8 of the shaft 4. Mounted on each of the hubs 3d are identical cams 9, the contours of which are shown, for example, in FIGURE 8. Thus, when the operator, by means of the handle 7, rotates the drum 3 he also rotates the two identical cams 9, and, as will be below pointed out, thereby actuates the feed of the paper sheets to the drum.

Suitably mounted on the frame formed by the end members 1 and the bottom plate 2 is any appropriate support for supporting the stack of sheets to be fed. I illustrate, for example, a platform having a top portion 10 shown as having downwardly turned reinforcing integral end flanges 11 which may be secured to the side members 1 as at 12. The top portion 10 has an upwardly and inwardly extending end portion 10a, the purpose of which will later appear. The paper may be held on, and guided on the surface 10 by laterally adjustable side walls or angles 13 shown, for example, in FIGURE 1, which may, for example, be adjusted along slots 13a in the top member 10. Whereas, the member 10 has a flush top at its rear edge, I provide, in order to position and limit and register the sheets, an adjustable slide or extension 14 with an arcuate upturned end wall 14a. It may be adjusted in any suitable manner, for example, by a nut or screw 14b movable along the slot 14c. 15 is any suitable bottle supporting clamp for receiving the liquid and the liquid in the bottle 15a. The liquid may be fed from the bottle through any suitable rubber hose or flexible member 15b. Any suitable frictional blocks or elements may be positioned in the upper walls or channels 13. I illustrate, as in FIGURE 3, any suitable bodies or blocks 16 which may be of sponge rubber or the like, and which may be controllable or adjustably thrust against the edges of the paper, for example, by a coil spring 17. 18 is any suitable adjustable nut which serves as a limit spot when threaded on the pin 19 which is secured to the back plate 16a of the frictional body 16. The sleeve 18a surrounds the spring 17 and serves as a fixed abutment opposed to the adjustable limiting abutment 18. Any suitable receiving tray 20 may be employed, the details of which do not of themselves form part of the present invention.

Considering now the feeding mechanism, I illustrate at each side of the device a feeding lever 21. Each such lever has an intermediary opposite or arcuate portion 22 on which is mounted any suitable contact element or roller 23, each such roller being opposed to the edge of one of the cams 9 and being normally urged against it, for example, by a coil spring 24, one end of which is fixed as at 25 to the end or frame members 1, whereas the other end as at 25a is secured to the feeding lever 21. The upper end of the lever 21 is pivoted as at 21a, for example, on a boss 21b extending inwardly from one of the frame or end members 1. Each of the levers 21 is pivoted at its lower end as at 21c to an arm or link 26. Each such link has a slotted end portion 26a with its slot 26b. Extending through each slot is a sleeve 27 which is secured to one of the side portions 11 of the paper support or tray, above described. The two links or slides 26 are preferably connected at their outer ends by any suitable tie rod 28. Extending upwardly from each of the arms or links 26 is an arm 29 having an upper generally horizontal portion 29a. Each of the arms extends through a suitable slot 29b in the upper member 10 of the support or tray for the stack of paper sheets to be fed. The ends of the horizontal arm portions 29a are shown as carrying a rotatable rod 30. This rod has about midway its ends an extending arm 30a carrying an adjustable weight 30b and having at its downwardly bent lower end a cross-shaft or rod 30c carrying anti-frictional elements 30d adapted to rest gravitationally on the top of a stack of sheets supported by the member 10. It will be understood that the gravital thrust can be controlled to an adjustable degree by the weight 30b along the rod portion 30a.

It will be understood that when the device is in its normal position, as shown in FIGURES 1 and 2, there is thus a downward pressure exerted on the top sheet by the weight 30b through the anti-frictional members 30d. Therefore, when the cam 9 is rotated to impart endwise movement to the links 26 to the right, referring to the position in which parts are shown in FIGURE 8, the result is to slide the top sheet of paper off of the stack and against the upwardly inclined portion 10a, as will be clear from FIGURE 4.

It will be understood that the primary purpose of the device is to feed the sheets successively to the drum in order to take an impression from a master on the drum. A suitable master is shown in FIGURE 10. Such a master may be constituted by a sheet 31 having at one edge an adhesive strip or area 31a. As will be clear from FIGURE 4, the adhesive strip 31a may be applied to the outer surface of the drum with the sheet or master 31 extending therefrom counter to the direction of rotation of the drum 3 indicated by arrows in FIGURE 4. In other words, the forward edge of the master 31 in direction of rotation is preferably adhesively secured to the surface of the drum so that the rest of the master trails it as the drum is rotated. If desired, the drum may be formed with a guide line 31b to locate the forward edge of the master. The guide line 31b may take the form of a painted line on the drum or may take the form of a very slight indentation or scratch in the drum surface. In the event an indentation is employed, it is not of sufficient size to disturb the continuous printing surface presented by the outer surface of the drum. The guide line may extend across the drum or it may be positioned only at the sides of the drum.

It will be understood that as the operator rotates the handle 7, he not merely rotates the drum 3 in the counter-clockwise direction, referring to the position of the parts in FIGURES 4 and 8, but also feeds toward the drum a sheet of paper indicated, for example, at X in FIGURE 4. The copy sheet may be fed to the machine by the feeding device as shown or may, under some circumstances, be advanced by hand to the feed rollers.

The structure whereby the sheet is actually moistened and applied to the drum to receive an impression from the master will now be described. I illustrate a liquid receiving housing which includes a trough 40 having an inner lip 40a, a front wall 40b, a top wall 40c, and an overhanging arcuate inner wall 40d terminating with the edge 40e. The trough 40 may be a separate element with the wall portions 40b, 40c, and 40d removable therefrom as a unit, the separation being indicated in FIGURE 4 and FIGURE 6 as at 40x. The trough 40 is provided with an externally extending nipple 41 to which the flexible hose 15b may be secured whereby a suitable liquid from the bottle 15a may be supplied to the trough 40. As will be clear from FIGURES 5 and 6, the end walls 40z of the trough carrying bearing blocks 42 may be secured for example by manually operable screws 42a, the lower part being further positioned by a positioning pin 42b. The lower parts of the bearing blocks 42 receive stub shaft 43a of the bottom roller 43 which may, for example, be of aluminum or some other suitable material. Opposed to the cylindrical surface of the hard roller 43 is a relatively flexible or distortable roller 44 which may be mounted, for example, on a core or shaft 44a, the reduced ends of which, as at 44b, enter appropriate apertures in adjustable bearing blocks 44c having flattened faces which slide in slots 44d. They are yieldingly and adjustably downwardly thrust along the slots 44d by suitable coil springs 44e, the thrust of which may be controlled by set screws 44f. Thus the thrust of the yielding roller 44 against the hard or solid roller 43 may be adjustable. Opposed to the first yielding roller 44 is a solid or yielding roller 45. It may be mounted in any suitable end bearings 45a in the frame or end members 1. It will be understood that the roller 45 is positively driven as below set out.

Referring now to FIGURE 8, an arm 46 is pivoted as at 46a within each of the end plates or frame members 1 and carries at its lower end a frictional or drive roller 46b. Because of this pivotal mounting, drive roller 46b is therefore slightly axially displaceable with respect to the support structure whereas the drum and train rollers 43, 44, and 45 are axially fixed with respect thereto. Due to the flexibility of roller 45 and the illustrated mode of axially supporting the rollers and drum, the drive roller 46b will bite or wedge into the space between roller 45 and the drum when the drum is rotated in a forward or paper feeding direction. Conversely, the wedging or biting effect on the drive roller is released when the drum rotates in a retrograde direction, as the drum tends to drive the roller away. The spring 46c will of course maintain contact between the drive roller and roller 45 and the drum since it is still pulling on the drive roller. This roller engages both the outer surface of an end portion of the drum 3 and the outer surface of an end portion of the roller 45. It is thrust against them yieldingly by the spring 46c which extends between the lower or outer end of the arm 46 and the frame or end member 1 to which it is anchored as at 46d. The arm 46 may be replaced by any other suitable means for holding the drive roller 46b in place, as, for example, by a slide.

The roller 45, as will be clear from FIGURE 4, presses against the upper surface of the typical sheet X, the opposite face of the sheet, when a sheet is being fed, being supported by a lower roller 47 which may, for example, be of metal or some similar firmly supporting material. The lower roller 47 is mounted on the upper arm 48 of a bell crank lever pivoted as at 48a to the end members 1 and having a lower lever arm 48b which receives a spring 48c the opposite end of which is secured as at 48d to one of the end members 1. It will be understood that all of the above structure is in duplicate at opposite ends of the device. It will be further understood that as a typical sheet of paper X is fed by the movement of the feeding links or arms 26, it will move between the rollers 45 and 47, the yielding roller 45 which is positively driven being effective to draw the paper between the two rollers, the hard roller 47 constituting the support against which the yielding roller works. The hard roller 47, of course, is urged upwardly against the yielding roller 45 by the action of the spring 48c. The train of rollers thus described is effective not merely to assist in feeding the paper, but to supply to the surface of the paper liquid from within the trough 40. In other words, the roller 44 wipes liquid from the rotated roller 43 and delivers it to the roller 45 which in turn delivers it to the upper surface of the typical paper sheet X. The paper sheet meanwhile is positively urged against the surface of the lower part of the drum by the yielding or rubber roller 50. This roller is mounted at each end on the upper arm 51 of a bell crank lever pivoted as at 52 to the end members 1 and having a lower arm 51a which carries an adjustable set screw 51b opposed to an eccentric 51c controllable by any suitable exterior handle 51d.

The above structure may be treated as typical of means for adjustably controlling the thrust of the yielding roller 50 which engages the lower surface of the typical sheet paper X and holds it against the drum 3 and thus against the master 31 which rotates with the drum. It will be understood that the moistened sheet thus receives its impression from the master on the drum as it passes beneath the drum and before it is received by the receiving trough structure 20.

It will be understood that as the user rotates the drum 3 by rotation of the handle 7, the drum, being rotated in the direction of the arrows of FIGURES 4 and 8, drives the roller 45 from the rotation of the member 46b. However, if the drum were rotated in the retrograde or clockwise direction, then the roller 46b would merely override the drum and would not exert sufficient driving pressure against the roller 45, which actually feeds the paper, to cause it to rotate in the reverse direction. Yielding means 46c would of course maintain drive roller 46b in contact with roller 45 and the drum when the drum rotates in the retrograde direction. Since the frictional force produced by the spring 46c between the drum and drive roller is less than the frictional force of the roller train, the roller train will not rotate in either direction upon retrograde movement of the drum.

It is important that excess liquid be disposed of when paper is not passing through the device. Naturally when the sheet X is passing through the device, any liquid which is delivered by the above described roller train will be received by the upper surface of the paper. This is true if the paper extends for the full width or length of the rollers. If the paper is narrower than the rollers there will be leakage at its ends. But in any event, any leakage which is received by the roller 47 is absorbed by a wick or wiper 60, shown as located between two pressure plates or limit plates 61, as illustrated in FIGURE 4. The upper end of the wiper 60 may be made to engage the lower surface of the roller 47 or it may be adjusted slightly away from it. The actual wiping may be performed by a flexible member or lip 62 which receives and delivers to the porous or absorbative members 60 the liquid adhering to the surface of the lower portion of the roller 47. Whereas this wiping feature is, in practice, important, it may be understood that I may under some circumstances dispense with it. If the wiper is dispensed with, liquid accumulating on the lower edge of the roller 47 will contact the upper surface of the wick and be absorbed. Actual contact of the wick and roller is unnecessary. The wick is, however, sufficiently close to the roller as to contact any liquid accumulating in the form of drops. One of the plates may be secured as at 61a, or the wick may be hinged or spring-pressed.

It will be realized that whereas I have described and shown a practical and operative device, nevertheless, many changes in size, shape, number and disposition of parts may be made without departing from the spirit of my invention. I therefore wish my description and drawings to be taken as in a broad sense illustrative or diagrammatic rather than as limiting me to the precise scope of the drawings.

The use and operation of my invention are as follows:

I illustrate a simple and compact duplicator in which a master may be applied to a solid surfaced drum by a mere adhesive connection. The sheets are positively fed to the drum in response to the rotation of the drum itself.

A suitable liquid is delivered to the upper surface of the paper by a drive which is responsive to the rotation of the drum. Excess liquid is readily removed from the bottom roller of the two which receives, feeds and moistens the paper.

The sheets are positively fed in response to the rotation of the drum from a stack which is adjustably guided and controlled. Pressure is applied to the top sheet by gravity.

The device may readily be adjusted to a wide variety of sizes of sheets.

The use of the particular drum and master shown and described herein enables the master to be located at any point on the surface of the drum, the guide line serving to illustrate the point on the drum where the forward edge of the copy sheet will ordinarily be located. The drum presents a printing surface around the full periphery of the drum. Any size of master may be employed, as long as it is not greater than the printing area of the drum. In some cases, masters having a length and width much smaller than the copy sheet may be employed, as may be desired in printing data in blank spaces provided in previously printed copy sheets.

Registration of the copy sheet and master is accomplished simply by moving the master from one point on the drum and reapplying it against the drum. Slight variances in registration may of course, be changed by slight adjustments to the feeding mechanism. Large variances in registration are accomplished by removing the master from one point on the drum and locating it at another point on the drum. It should be understood that slight variances in registration may be accomplished also by varying the position of the master on the drum.

The machine is assembled in a simple manner. It is light in weight and may be manipulated easily by the operator.

The roller train is driven from the surface of the drum. The rollers 46b are so mounted that the drive to the roller train is discontinued when the drum is rotated in a retrograde direction.

The present application is a continuation in part of application Serial No. 168,435, filed June 16, 1955, now abandoned.

I claim:

1. In a duplicating machine, a support, a drum rotatably mounted on said support and means for rotating it, means for feeding paper sheets to the drum and moistening the paper sheets fed to said drum, including a trough having liquid therein and a train of rollers on said support, comprising a roller in contact with said liquid, a second roller formed of a yieldable, distortable material in rolling contact with said liquid contacting roller, a driven paper contacting roller formed of a yieldable, distortable material in rolling contact with said second roller, a driving roller in direct engagement with the drum for driving the aforesaid paper contacting roller, and a second paper contacting roller in rolling contact with said first named paper contacting roller.

2. In a duplicating device, a rotatable drum and support therefor, a roller train for feeding paper to said drum and means for rotating the rollers in said roller train when said drum is rotated in one direction and for interrupting the rotation of said rollers when the drum is rotated in the opposite direction, including a rotatable roller in rolling contact with said drum and adapted to be placed in rolling contact with one of said rollers at a point between the axes of said drum and said last named roller outside the common plane of said axes when the drum is rotated in said one direction, and yielding means for maintaining said rolling contact when the drum is rotated in said one direction, said yielding means having insufficient strength to prevent movement of the rotatable roller when the drum is rotated in the opposite direction.

3. The structure of claim 1 characterized by and including a third paper contacting roller movable mounted for rolling contact with said drum, and means for adjustably predetermining its pressure.

4. The structure of claim 1 characterized by and including a third paper contacting roller in rolling contact with said drum and adapted to accept a paper sheet therebetween, and means for adjustably varying the pressure of said roller against said drum, including a support for said roller connected to said roller adjacent one of its ends and pivotally connected intermediate its ends to said drum support structure, an eccentric having its edge in contact with the other end of said roller support, and means for turning said eccentric.

5. In a paper feed and moistening device for duplicating machines and the like comprising a liquid supply and a train of rollers having a roller in contact with said liquid, means for removing a large excess of liquid from the lowermost roller in said train such as that which is deposited on said rollers when the machine is operated without paper or with paper of a width less than the length of the rollers in said train, including an absorbent member positioned just out of contact and substantially directly beneath the lowermost roller in the train.

6. The structure of claim 5 characterized by and including a wiper member adjacent said absorbing member and projecting upwardly into contact with the lowermost roller.

7. In a duplicating machine, a support, a drum rotatably mounted on said support, a train of rollers mounted on the support, a drive roller carried by the support, said drive roller being in contact with the drum and roller train, yielding means urging the drive roller into contact with the roller train irrespective of the direction of drum rotation, said yielding means exerting a frictional force between the drum and drive roller smaller than the frictional force of the roller train, and means for rotating the drum in a forward direction and in a retrograde direction, said drive roller being effective, by virtue of the driving force created by rotation of the drum in a forward direction, to overcome the frictional force of the roller train whereby said train is driven in a forward direction, said drive roller being ineffective, by virtue of retrograde movement of the drum and the frictional force of the roller train, to rotate the roller train in a forward direction.

8. In a duplicating machine, a support, a drum rotatably mounted on said support, a train of rollers mounted on said support, at least one roller of said train of rollers having a yieldable, distortable exterior, the drum and roller train being axially fixed with respect to the support, a drive roller carried by the support and axially movable with respect thereto, said drive roller being in contact with the drum and the distortable train roller, yielding means for maintaining the drive roller in contact with the roller train irrespective of the direction of drum rotation, the frictional force of the roller train being greater than the frictional force between the drum and drive roller created by the yielding means, and means for rotating the drum in a forward direction and in a retrograde direction, said drive roller being effective, by virtue of the driving force created by rotation of the drum in a forward direction, to overcome the frictional force of the roller train whereby said train is driven in a forward direction, said drive roller being ineffective, by virtue of retrograde movement of the drum and the frictional force of the roller train, to rotate the roller train in either direction.

9. In a duplicating machine, a support, a drum rotatably mounted on said support, a train of rollers mounted on the support, means for rotating the drum in a forward and in a retrograde direction, and means for rotating the roller train forwardly in response to rotation of the drum in a forward direction and for maintaining the roller train stationary in response to retrograde rotation of the drum.

10. The duplicating machine of claim 9 further characterized in that the last mentioned means includes a drive roller in contact with the drum and roller train, said drive roller being carried by the support, and yielding means for maintaining the drive roller in contact with the roller train and drum irrespective of the direction of drum rotation, the frictional force of the roller train being greater than the frictional force between the drum and drive roller created by the yielding means.

11. The duplicating machine of claim 10 further characterized firstly, in that the exterior of the train roller in contact with the drive roller is formed of a distortable material, and secondly, that the drum and train rollers are axially fixed with respect to the support and the drive roller is slightly axially displaceable with respect to said support whereby said drive roller may be wedged into the space between the train roller with which it makes contact and the drum when the drum rotates in a forward direction and unwedged from said space when the drum rotates in a retrograde direction.

References Cited in the file of this patent

UNITED STATES PATENTS

| | | |
|---|---|---|
| 2,106,732 | Goedike | Feb. 1, 1938 |
| 2,126,514 | Storck et al. | Aug. 9, 1938 |
| 2,172,876 | Marchev | Sept. 12, 1939 |
| 2,315,175 | Williams | Mar. 30, 1943 |
| 2,351,863 | Levenhagen et al. | June 20, 1944 |
| 2,378,185 | Chatterton | June 12, 1945 |
| 2,398,646 | Karbach et al. | Apr. 16, 1946 |
| 2,565,370 | Hodin | Aug. 21, 1951 |
| 2,588,917 | Geib | Mar. 11, 1952 |
| 2,594,179 | Keil | Apr. 22, 1952 |
| 2,622,519 | Keil | Dec. 23, 1952 |
| 2,659,304 | Keil | Nov. 17, 1953 |
| 2,722,886 | Keil | Nov. 8, 1955 |
| 2,830,534 | Springer et al. | Apr. 15, 1958 |

FOREIGN PATENTS

| | | |
|---|---|---|
| 633,097 | France | Jan. 20, 1928 |